United States Patent
Amagasa

(10) Patent No.: US 8,659,251 B2
(45) Date of Patent: Feb. 25, 2014

(54) WIPER MOTOR

(75) Inventor: Toshiyuki Amagasa, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 104 days.

(21) Appl. No.: 13/338,363

(22) Filed: Dec. 28, 2011

(65) Prior Publication Data

US 2012/0176073 A1    Jul. 12, 2012

(30) Foreign Application Priority Data

Jan. 7, 2011   (JP) ................................. 2011-002005

(51) Int. Cl.
   *H02K 29/08*   (2006.01)
(52) U.S. Cl.
   CPC ...................................... *H02K 29/08* (2013.01)
   USPC ............ 318/400.38; 318/400.37; 318/400.01; 318/700
(58) Field of Classification Search
   CPC ..................................................... H02K 29/08
   USPC .................. 318/400.38, 400.37, 400.01, 700
   See application file for complete search history.

(56) References Cited

U.S. PATENT DOCUMENTS

| | | | |
|---|---|---|---|
| 5,485,046 A * | 1/1996 | Kaplan et al. | 310/166 |
| 6,756,711 B2 * | 6/2004 | Matsuyama et al. | 310/68 R |
| 6,763,733 B2 * | 7/2004 | Tokumoto | 73/862.333 |
| 7,262,528 B2 * | 8/2007 | Amagasa | 310/68 R |
| 7,423,405 B2 * | 9/2008 | Okai et al. | 318/727 |

FOREIGN PATENT DOCUMENTS

JP        2010-93977 A        4/2010

* cited by examiner

*Primary Examiner* — Bentsu Ro
*Assistant Examiner* — David Luo
(74) *Attorney, Agent, or Firm* — McCormick, Paulding & Huber LLP

(57) ABSTRACT

In a wiper motor including a motor unit having a rotating shaft, and a gear unit having a speed reduction mechanism for reducing and outputting the speed-reduced rotation, a first speed reduction gear forming a speed reduction mechanism is provided to one end side of a rotating shaft, a sensor magnet is fixed to the other end side of the rotating shaft, a control board is provided so as to face the other end side of the rotating shaft from the axial direction of the rotating shaft, a MR sensor for detecting a rotational state of the rotating shaft is provided to a facing portion of the control board to the sensor magnet, and coil end portions of coils configured to generate an electromagnetic force for rotating the rotating shaft on the basis of supply of drive current from the control board is electrically connected to the control board.

4 Claims, 7 Drawing Sheets

WIPER MOTOR

CROSS-REFERENCE TO RELATED APPLICATION

The present application claims priority from Japanese Patent Application No. 2011-002005 filed on Jan. 7, 2011, the content of which is hereby incorporated by reference into this application.

TECHNICAL FIELD OF THE INVENTION

The present invention relates to a wiper motor including a motor unit having a rotating shaft, and a gear unit having a speed reduction mechanism for reducing the speed of rotation of a rotating shaft and outputting the speed-reduced rotation.

BACKGROUND OF THE INVENTION

Conventionally, a motor having a speed reduction mechanism (hereinafter simply referred to as "motor with speed reduction mechanism") is used as a drive source of a wiper device and the like to be mounted on a vehicle. The motor with speed reduction mechanism is designed so as to be a small-sized high power drive source in consideration of on-vehicle mountability. The motor with speed reduction mechanism includes a motor unit having a rotating shaft, and a gear unit having a speed reduction mechanism (such as worm and worm wheel), and is designed so that its torque is enhanced by the speed reduction mechanism by reducing rotation of the rotating shaft and a rotational force is outputted to the outside from an output shaft provided to the speed reduction mechanism.

As a motor with speed reduction mechanism which is used as a drive source of a wiper device, a motor provided with a control board for controlling the rotational direction of a rotating shaft and the number of rotations is known. As described above, a motor with speed reduction mechanism provided with the control board, for example, a motor with speed reduction mechanism disclosed in Patent Document 1 (Japanese Unexamined Patent Application Publication No. 2010-093977, FIG. 3) is known.

The motor with speed reduction mechanism disclosed in the Patent Document 1 includes a motor unit having a rotating shaft, and a speed reduction unit having a speed reduction mechanism formed of worm and worm wheel. The speed reduction unit includes a gear housing having a main body unit and a cover, the speed reduction mechanism is rotatably accommodated in the gear housing. A circuit board (control board) mounted with a plurality of circuit elements (magnetic sensor and the like) is accommodated in the gear housing, and arranged so as to cover the speed reduction mechanism in the axial direction of an output shaft.

And, the control circuit provided to the outside is configured to recognize a rotational state of the rotating shaft and the like based on a detection signal from the magnetic sensor and the like, and to control the rotational direction (positive rotation or negative rotation) and the rotational speed of the rotating shaft.

SUMMARY OF THE INVENTION

However, according to the motor with speed reduction mechanism disclosed in the Patent Document 1, a circuit board mounted with a plurality of circuit elements is accommodated in the gear housing and arranged in the vicinity of a speed reduction mechanism so as to cover the speed reduction mechanism. Therefore, this motor encounters such a problem that dusts frictionally generated from a meshing portion between the worm and the worm wheel which form the speed reduction mechanism, and grease and the like applied to the meshing portion are easily attached to the circuit board by the rotational drive of the motor with speed reduction mechanism.

When the extraneous matters such as frictionally-generated dusts and grease are attached to the circuit board, the extraneous matters function as a heat insulating material to reduce heat dissipation of the circuit board and end up causing malfunction of each circuit element and lowering detection accuracy of the magnetic sensor and the like. Therefore, it is difficult to control the rotating shaft with high accuracy at an early stage, and necessary to frequently perform maintenance and overhaul.

An object of the present invention is to protect a circuit board from extraneous matters such as frictionally-generated dusts, grease and the like, and provide a wiper motor capable of controlling a rotating shaft with high precision over a long period of time.

A wiper motor according to the present invention includes a motor unit having a rotating shaft, and a gear unit having a speed reduction mechanism for reducing the speed of rotation of the rotating shaft and outputting the speed-reduced rotation, the wiper motor comprises: a first speed reduction gear provided to one end side of the rotating shaft and forming the speed reduction mechanism; a second speed reduction gear meshed with the first speed reduction gear to form the speed reduction mechanism and having an output shaft at a rotational center thereof; a sensor magnet fixed to the other end side of the rotating shaft; a control board facing the other end side of the rotating shaft from the axial direction of the rotating shaft; a rotation sensor provided to a portion facing the sensor magnet of the control board and detecting a rotational state of the rotating shaft; and a coil having one end side electrically connected to the control board and generating the electromagnetic force for rotating the rotating shaft by supply of drive current from the control board.

In the wiper motor according to the present invention, a magnet is mounted on the rotating shaft and the coil is wound on the inside of a stator, and the rotating shaft is rotatably provided inside the stator under a contactless state between the magnet and the coil.

In the wiper motor according to the present invention, the control board is accommodated in a board case having a connector connecting portion to which an external connector is connected, and the board case is mounted on an end portion of the motor case which forms the motor unit.

In the wiper motor according to the present invention, the rotation sensor is a MR sensor having a resistance value which is changed in response to the change of a magnetic field due to the rotation of the sensor magnet.

According to the wiper motor of the present invention, a first speed reduction gear forming a speed reduction mechanism is provided to one end side of a rotating shaft, a sensor magnet is fixed to the other end side of the rotating shaft, a control board is provided so as to face the other end side of the rotating shaft in the axial direction of the rotating shaft, a rotation sensor for detecting a rotational state of the rotating shaft is provided to a facing portion of the control board to the sensor magnet, and one end side of a coil configured to generate an electromagnetic to rotate the rotating shaft on the basis of supply of drive current from the control board is electrically connected to the control board. In this way, the speed reduction mechanism and the control board can be respectively provided to one end side and the other end side of the rotating shaft so as to be kept away from each other, and it makes it difficult to bring the extraneous matters such as frictionally-generated dusts, grease and the like to reach the control board. Therefore, it is possible reduce malfunction of each circuit element and degradation of detection precision of the magnetic sensor and the like by reducing deterioration of heat dissipation of the control board, and it is possible to reduce maintenance and overhaul in comparison with conventional ones and to control a rotating shaft with high precision over a long period of time.

According to the wiper motor of the present invention, since the magnet is mounted on the rotating shaft, the coil is wound on the inside of the stator, and the rotating shaft is rotatably provided on the inside of the stator while taking a state where the magnet is kept from coming contact with each of the coils, the wiper motor can be formed by a brushless motor. Consequently, as dusts are not frictionally generated by brush, it is possible to further suppress attachment of extraneous matters to the control board.

According to the wiper motor of the present invention, since the control board is accommodated in a board case having a connector connecting portion to which an external connector is connected, and the board case is mounted on the end portion of the motor case forming a motor unit, it is possible to accommodate the control board in the board case in advance. Therefore, a variety of control boards different from each other in specification are accommodated in one common board case, and anyone of these control boards is arbitrarily selected according to necessary specifications, and thus, the wiper motor of different specifications can be easily constructed.

According to the wiper motor of the present invention, since the rotation sensor is a MR sensor having a resistance value which is changed in response to the change of a magnetic field due to the rotation of the sensor magnet, it is possible to provide the wiper motor without movable units such as switching components and the like. Therefore, it is possible to enhance the reliability of the wiper motor and to control the rotating shaft with high precision over a long period of time.

BRIEF DESCRIPTIONS OF THE DRAWINGS

DESCRIPTIONS OF THE PREFERRED EMBODIMENTS

Hereinafter, a wiper motor according to the first embodiment of the present invention will be described in detail with reference to the drawings.

Figure 1:
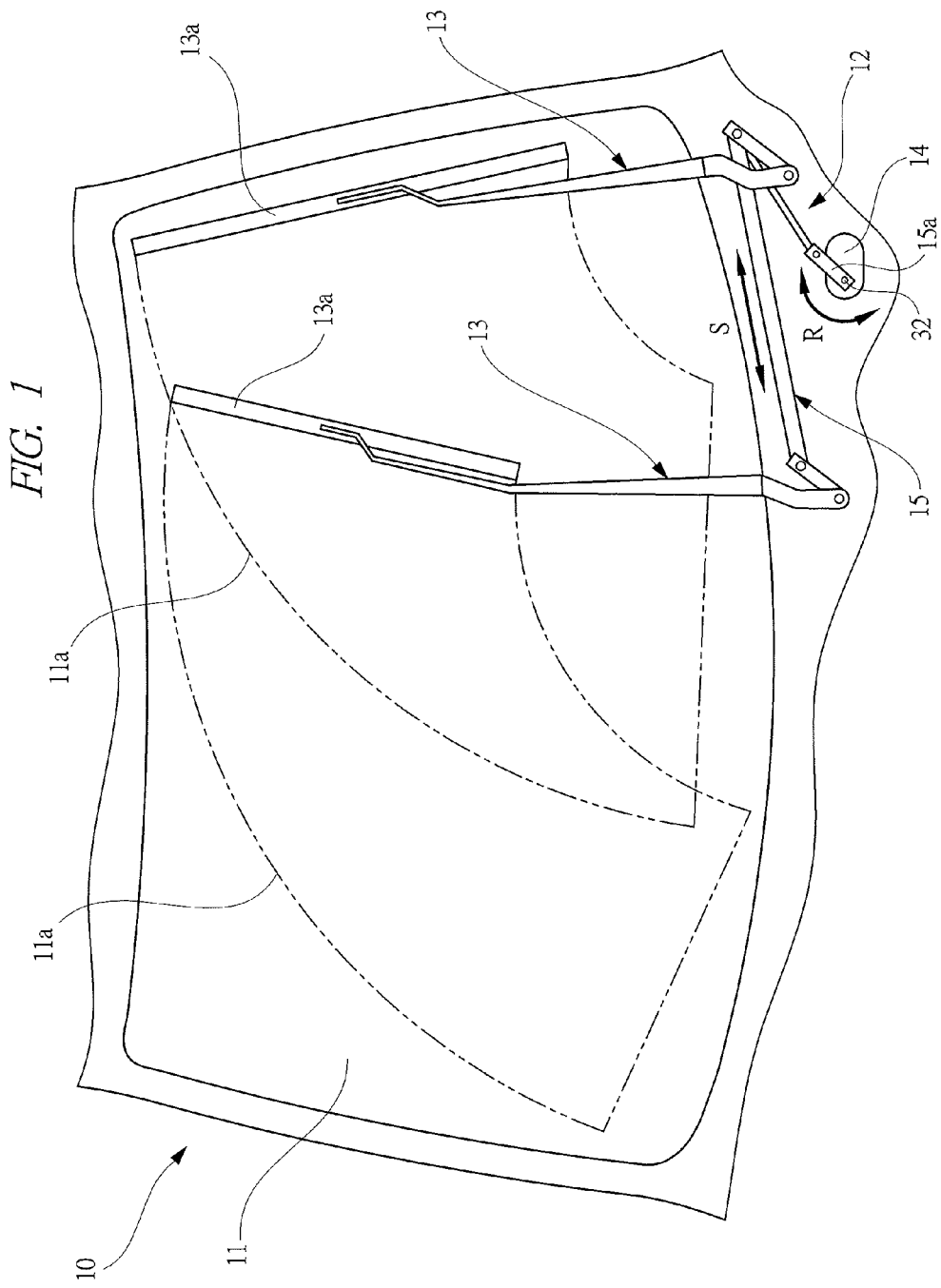
FIG. 1 is a view explaining a wiper device provided with a wiper motor according to the present invention.
Figure 2:
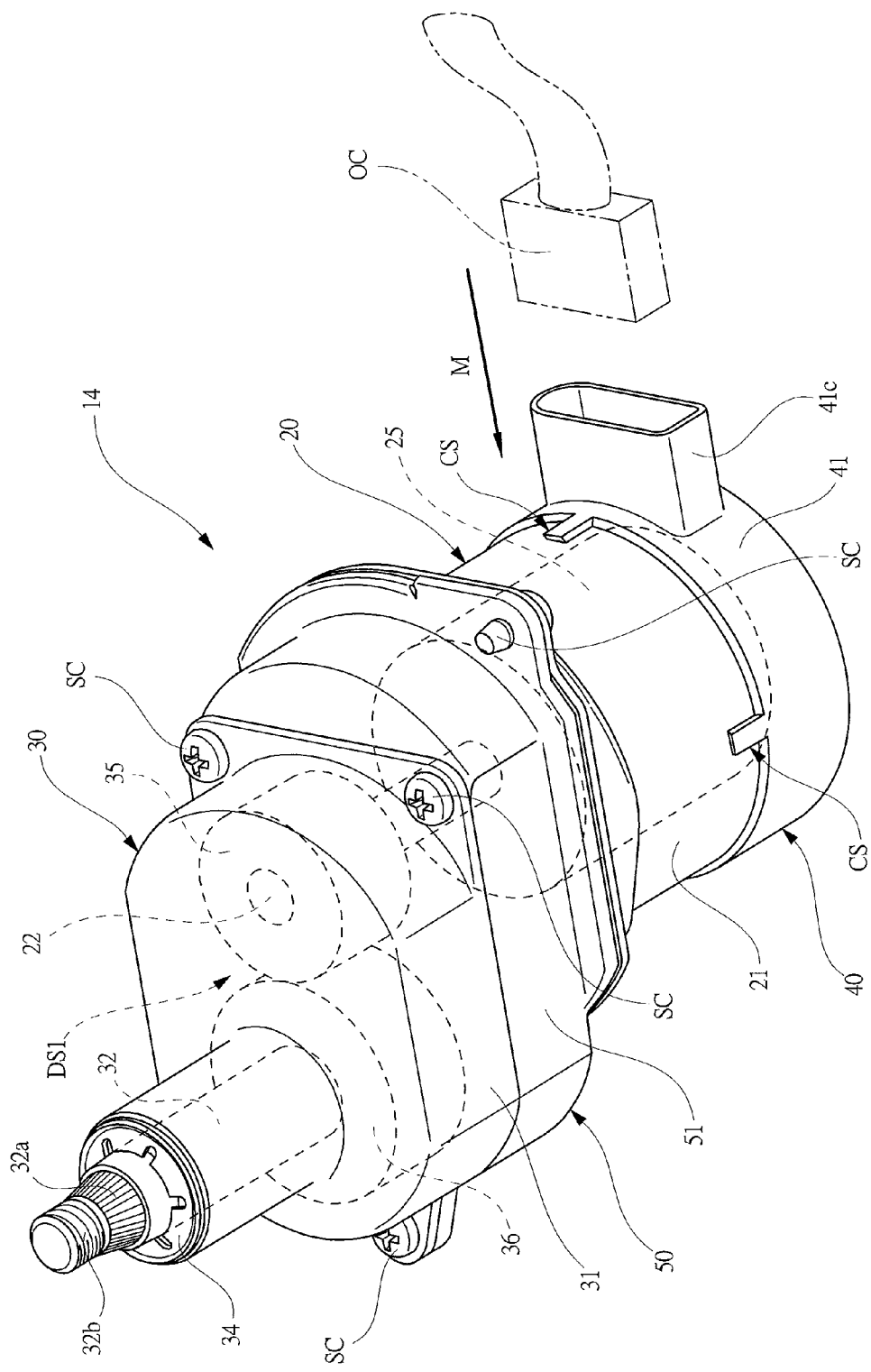
FIG. 2 is an enlarged perspective view of the wiper motor shown in FIG. 1.
Figure 3:
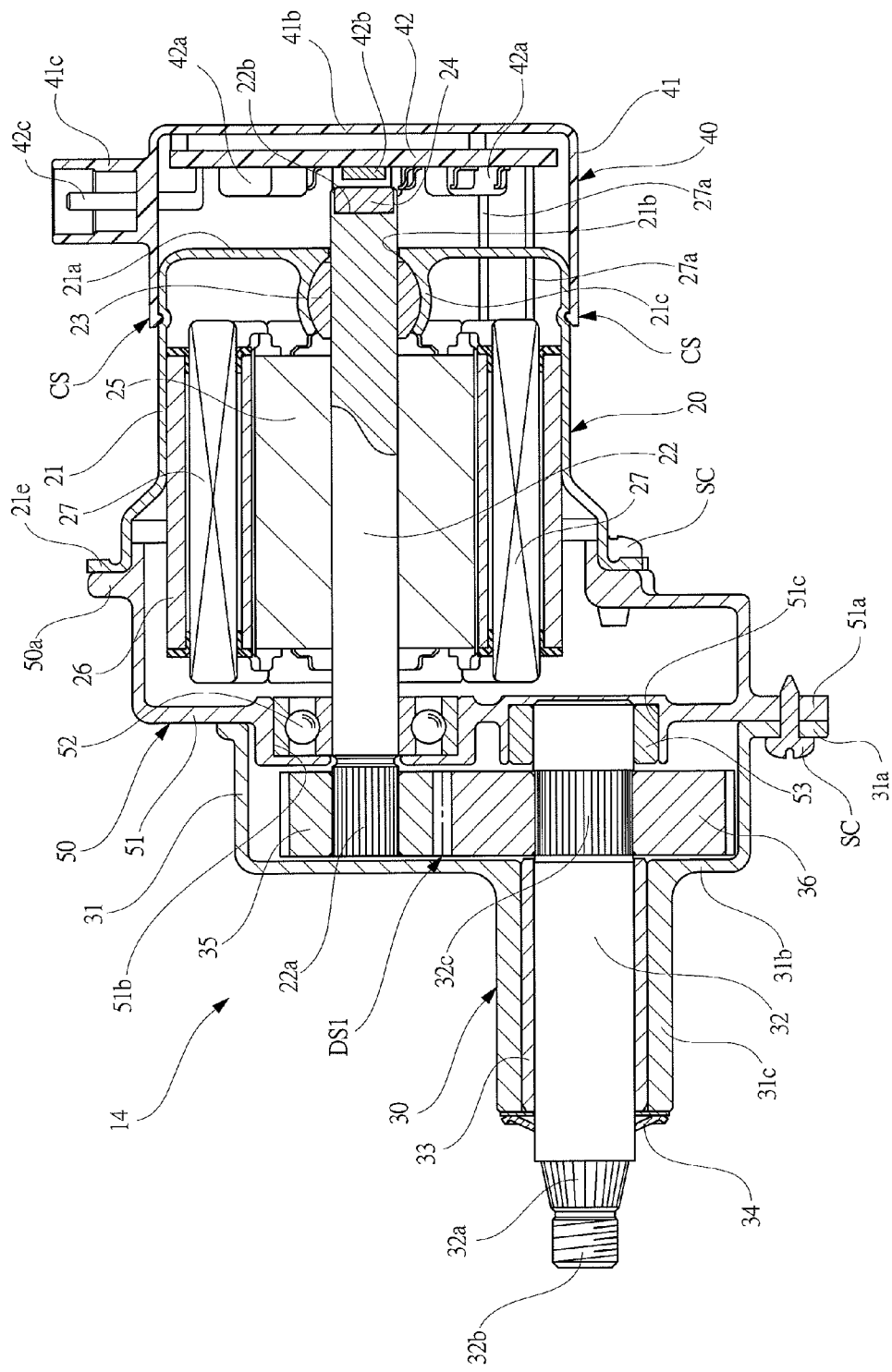
FIG. 3 is a cross sectional view of the wiper motor shown in FIG. 2 along a rotating shaft and an output shaft.
Figure 4:
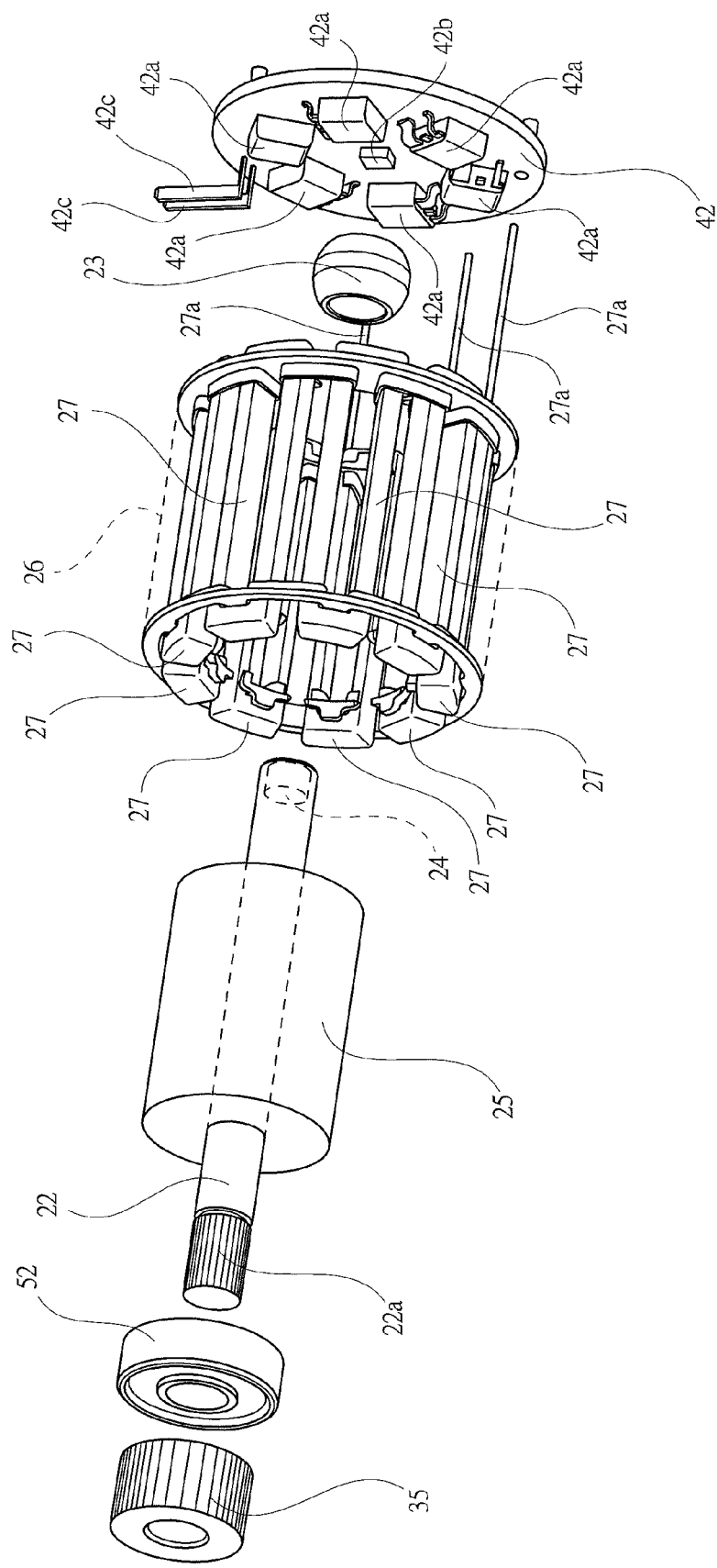
FIG. 4 is an exploded perspective view explaining an internal structure of a motor unit shown in FIG. 3.
Figure 5:
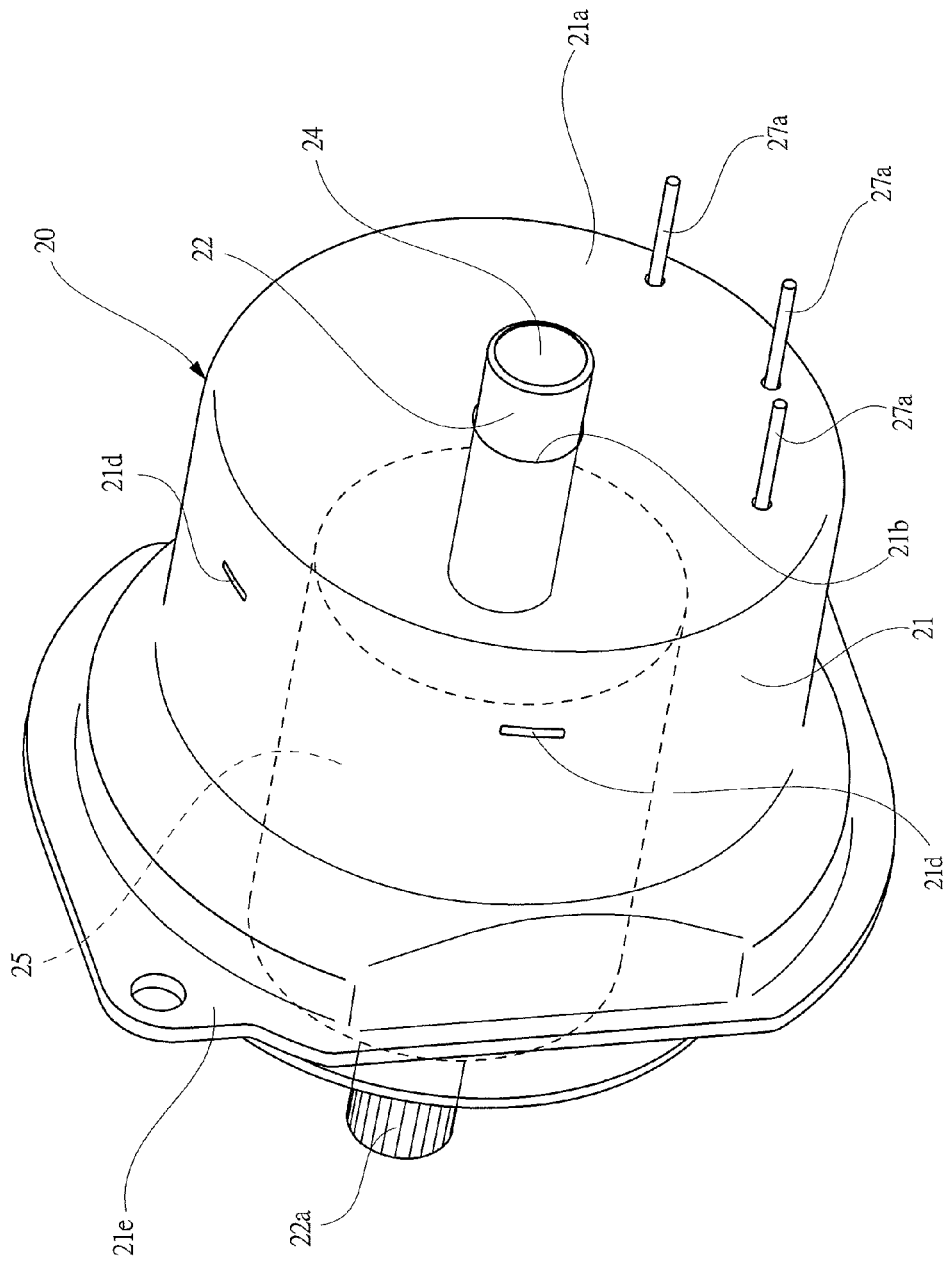
FIG. 5 is a bottom perspective view of a motor case in FIG. 3.
Figure 6:
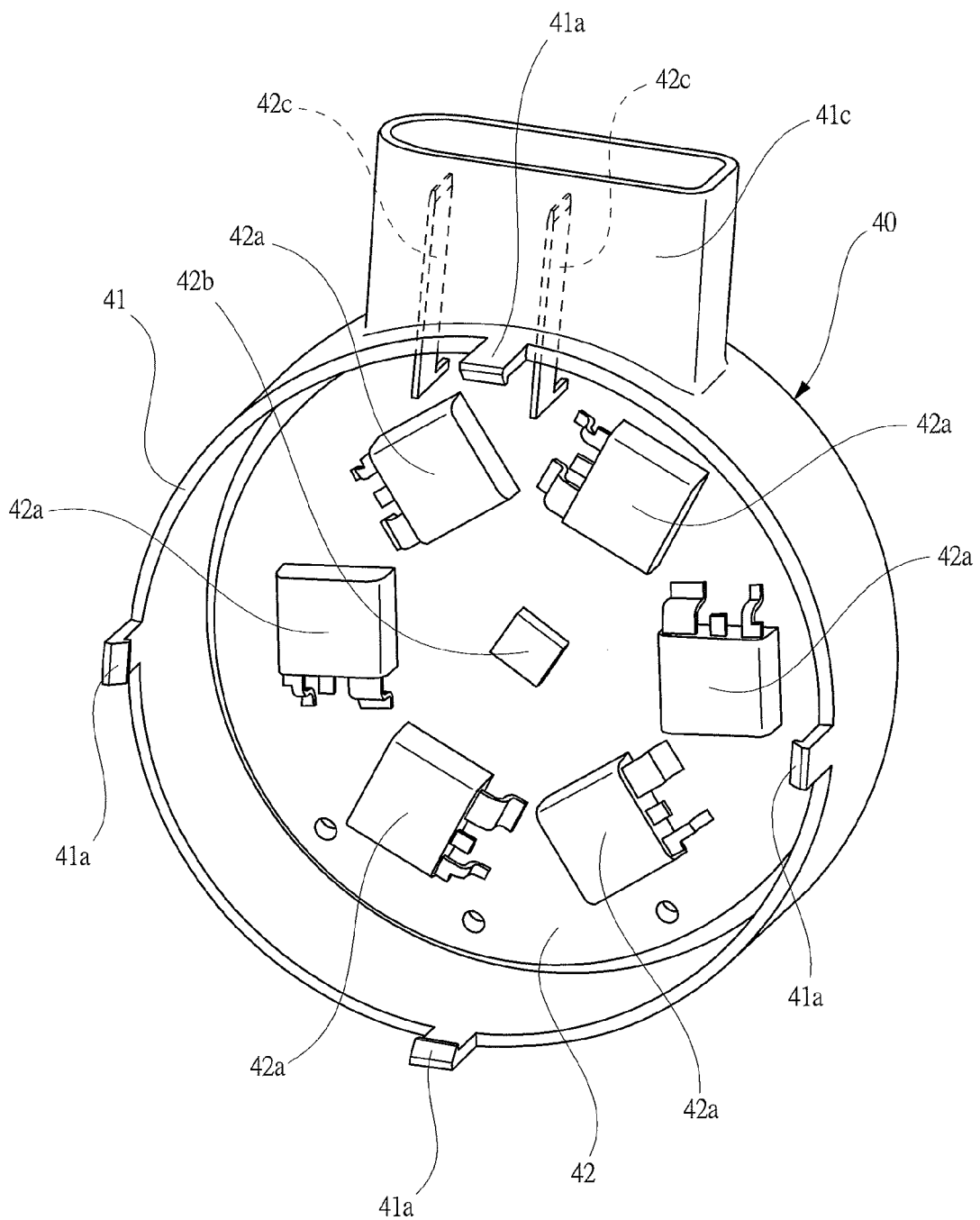
FIG. 6 is a perspective view of a board case in FIG. 3 seen from its opening portion side.

FIG. 1 is a view explaining a wiper device provided with a wiper motor according to the present invention, FIG. 2 is an enlarged perspective view of the wiper motor shown in FIG. 1, FIG. 3 is a cross sectional view of the wiper motor shown in FIG. 2 along a rotating shaft and an output shaft, FIG. 4 is an exploded perspective view explaining an internal structure of a motor unit shown in FIG. 3, FIG. 5 is a bottom perspective view of a motor case in FIG. 3, and FIG. 6 is a perspective view of a board case in FIG. 3 seen from its opening portion side.

As shown in FIG. 1, a front glass 11 as a window shield is provided at the front side of a vehicle 10 such as an automotive vehicle, and a wiper device 12 for wiping rain water, dusts and the like on the front glass 11 is mounted at a front end portion of the front glass 11 in the vehicle 10. The wiper device 12 includes a pair of wiper members 13 provided to a driver seat side and a front passenger seat side, and a wiper motor (wiper motor) 14. The wiper motor 14 is connected to a base end side of each wiper member 13 through a link mechanism 15, and configured to swing and drive each wiper blade 13a provided to the tip end side of each wiper member 13 on the front glass 11.

The wiper motor 14 is a positive and negative rotation type wiper motor (reversible wiper motor) which alternatively performs positive and negative rotations on the basis of predetermined control logic. Therefore, the link mechanism 15 swings in the direction of an arrow S in the drawing by repetitive positive and negative rotations of the wiper motor 14 as shown by an arrow R in the drawing. Each wiper blade 13a performs a reciprocating wiping action in each wiping range 11a shown in FIG. 1. In this way, it is possible to wipe out rain water, dusts and the like attached to the front glass 11.

As shown in FIGS. 2 to 6, the wiper motor 14 is a motor with speed reduction mechanism which is provided with a speed reduction mechanism DS1, and includes a motor unit 20, a gear unit 30, and a controller unit 40. The motor unit 20 and the gear unit 30 are connected to each other by a plurality of fastening screws SC through a connecting member 50, and the gear unit 30 and the controller unit 40 are connected to each other by a connecting mechanism CS.

The motor unit 20 includes a motor case 21 which is formed from a steel plate into a bottomed cylinder shape by a deep drawing work (press work) and the like. A bottom portion 21a of the motor case 21 is provided with a through hole 21b through which the other end side (right side in FIG. 3) of a rotating shaft 22 penetrates. A bearing holding portion 21c is integrally provided on the inside of the motor case 21 in the vicinity of the through hole 21b. The bearing holding portion 21c holds a first radial bearing 23 for smoothly rotating the rotating shaft 22.

As shown in FIG. 5, a plurality of engaging concave portions 21d are provided to an outer circumferential side of the motor case 21 and arranged along a circumferential direction of the motor case 21. A total of four engaging concave portions 21d (only two pieces in FIG. 5) are provided along the circumference of the motor case 21 at regular intervals (at intervals of 90 degrees), and hollowed toward its inner portion from the outside in the radial direction of the motor case 21. The engaging concave portions 21d are engaged with respective engaging claw portions 41a (see FIG. 6) which are integrally provided to a board case 41 so as to correspond to the respective engaging concave portions 21d. Here, each engaging concave portion 21d and each engaging claw portion 41a constitute a connecting mechanism CS, thereby solidly fixing the board case 41 to the motor case 21 with one-touch operation by causing the engaging concave portions 21d to be engaged with the respective engaging claw portions 41a.

A radially-outwardly projecting annular flange portion 21e is integrally provided to an opening side (left side in FIG. 3) of the motor case 21. Since the flange portion 21e abuts on a first flange portion 50a provided to the connecting member 50, it is possible to connect both flange portions to each other without deviation by fastening them with each fastening screw SC with the predetermined fastening torque.

One end side (left side in FIG. 3) of the rotating shaft 22 is integrally provided with a serration portion 22a composed of concavities and convexities extending in the axial direction. A first speed reduction gear 35 which forms the speed reduction mechanism DS1 is fixed to the serration portion 22a, so that the first speed reduction gear 35 and the rotation shaft 22 are solidly fixed to each other, and it is possible to prevent the first speed reduction gear 35 from running idle.

One end side of the rotating shaft 22 is rotatably supported by a second radial bearing 52 provided to the connecting member 50, and projects into the gear unit 30 through the second radial bearing 52.

The other end side of the rotating shaft 22 is rotatably supported by the first radial bearing 23, and projects into the controller unit 40 through the first radial bearing 23 and the through hole 21b. A mounting concave portion 22b hollowed along the axial direction of the rotating shaft 22 is provided to an end face of the other end portion of the rotating shaft 22. A sensor magnet 24 formed into an approximately disc shape is fixed to the mounting concave portion 22b, magnetized so as to have a plurality of polarities in such a manner that "N" and "S" poles are alternatively arranged along its circumferential direction, and rotates together with the rotating shaft 22.

A magnet 25 formed into an approximately cylindrical shape is fixed to an approximately center and outer circumferential portion in the axial direction of the rotating shaft 22 so as to extend in the axial direction of the rotating shaft 22. The magnet 25 is rotated by the electromagnetic force of coils 27 provided to the outer circumferential side of the magnet 25, also magnetized in such a manner that "N" and "S" poles are alternatively arranged along its circumferential direction, and rotates together with the rotating shaft 22.

A stator 26 formed into an approximately cylindrical shape is fixed on the inside of the motor case 21 by press-fitting. A plurality of teeth (not shown) which radially extend toward the center portion of the stator 26 are integrally provided on the radially inside of the stator 26, and the coils 27 are wound around respective teeth by concentrated winding.

The magnet 25 is provided on the inside of the coils 27 through a predetermined gap (air gap), so that the rotating shaft 22 is rotatable on the inside of the stator 26 under a contactless state where the magnet 25 is kept from coming contact with each of the coils 27. Here, the rotating shaft 22, the magnet 25, the stator 26, and the coils 27 form a brushless motor. Each coil 27 has phases U, V, and W, and three coil end portions 27a provided to one end of each coil 27 are electrically connected to a control board 42 which is accommodated in the board case 41 by penetrating the bottom portion 21a of the motor case 21 as shown in FIG. 5.

Each of the coils 27 of the phases U, V, and W is supplied with drive current from the control board 42 at a predetermined timing, so that electromagnetic force is generated around it. A rotational force is generated in the magnet 25 by the generation of the electromagnetic force, thereby rotating the rotating shaft 22 with predetermined rotational torque, number of rotations, and rotational direction. Incidentally, by switching the direction of the drive current to be supplied to the coils 27 from one side (phase U, phase V, and phase W in this order) to the other side (phase W, phase V, and phase U in this order), the rotation of the rotating shaft 22 is switched from a positive rotation to a negative rotation.

The gear unit 30 includes a gear case 31 which is for example casted from molten aluminum material so as to be formed into a bottomed cylindrical shape. The opening side (right side in FIG. 3) of the gear case 31 faces the opening side of the motor case 21, and is integrally provided with a radially-outwardly projecting flange portion 31a. Since the flange portion 31a abuts on a second flange portion 51a provided to the connecting member 50, it is possible to connect the flange portions to each other without deviation by fastening them with each fastening screw SC with the predetermined fastening torque.

A bottom portion 31b of the gear case 31 is integrally provided with a support cylinder 31c formed into an approximately cylindrical shape. An output shaft 32 parallel to the rotating shaft 22 is provided so as to penetrate the support cylinder 31c. A third radial bearing 33 is provided between the support cylinder 31c and the output shaft 32. The third radial bearing 33 has a function to allow the rotating shaft 22 to be smoothly rotated.

The output shaft 32 is set to be larger than the rotating shaft 22 in diameter, and the output shaft 32 is higher in rigidity than the rotating shaft 22. In this way, the output increased in torque by the speed reduction mechanism DS1 can be stably outputted to the outside.

One end side (left side in FIG. 3) of the output shaft 32 is integrally provided with a first serration portion 32a composed of concavities and convexities extending in the axial direction and a male screw portion 32b close to the first serration portion 32a. The first serration portion 32a is engaged with one end side of an output plate 15a (see FIG. 1) which forms the link mechanism 15. Furthermore, the male screw portion 32b is fastened by thread connection to a fixing nut (not shown) for fixing the output plate 15a to the output shaft 32. In this way, the output plate 15a is solidly fixed to the output shaft 32 so as not to run idle.

One end side of the output shaft 32 is mounted with a stop ring 34, so that the stop ring 34 prevents play of the output shaft 32 to the support cylinder 31c in the axial direction. In this way, it is possible to prevent the play of the link mechanism 15 when the wiper motor 14 is rotationally driven, and it is possible to suppress generation of abnormal noises from the link mechanism 15 and uneven wear of movable portions of the link mechanism 15, that is, a joint ball portion (not shown) and the like.

The other end side (right side in FIG. 3) of the output shaft 32 is integrally provided with a second serration portion 32c composed of concavities and convexities extending in the axial direction. A second speed reduction gear 36 which forms the speed reduction mechanism DS1 by meshing with the first speed reduction gear 35 is fixed to the second serration portion 32c. Since the second serration portion 32c is fixed to the rotation center of the second speed reduction gear 36, it is possible to prevent the second speed reduction gear 36 from running idle. Furthermore, the other end side of the output shaft 32 is rotatably supported by a fourth radial bearing 53 provided to the connecting member 50.

The speed reduction mechanism DS1 which reduces the speed of rotation of the rotating shaft 22 and outputting the speed-reduced rotation to the outside through the output shaft 32 is rotatably accommodated in the gear case 31. The speed reduction mechanism DS1 is constituted by the first speed reduction gear 35 fixed to the serration portion 22a of the rotating shaft 22, and the second speed reduction gear 36 fixed to the second serration portion 32c of the output shaft 32. The first speed reduction gear 35 is set to be smaller in diameter than the second speed reduction gear 36. In this way, its torque is enhanced by reducing rotation of the rotating shaft 22 with a predetermined speed reduction ratio and the output increased in torque is outputted to the outside from the output shaft 32.

The connecting member 50 is for example casted from molten aluminum material so as to be formed into a bottomed cylindrical shape. The opening side (right side in FIG. 3) of the connecting member 50 faces the opening side of the motor case 21 and a bottom portion 51 side (left side in FIG. 3) of the connecting member 50 faces the opening side of the gear case 31. In other words, the connecting member 50 is arranged between the motor case 21 and the gear case 31.

The opening side of the connecting member 50 is integrally provided with the first flange portion 50a which abuts on the flange portion 21e of the motor case 21, and the bottom portion 51 side of the connecting member 50 is integrally provided with the second flange portion 51a which abuts on the flange portion 31a of the gear case 31. In this way, the connecting member 50 is solidly fixed between the motor case 21 and the gear case 31 through each fastening screw SC.

The bottom portion 51 of the connecting member 50 is integrally provided with a first bearing fixing concave portion 51b hollowed toward the gear case 31 and a second bearing fixing concave portion 51c hollowed toward the motor case 21. The second radial bearing 52 rotatably supporting one end side of the rotating shaft 22 is fixed to the first bearing fixing concave portion 51b, and the fourth radial bearing 53 rotatably supporting the other end side of the output shaft 32 is fixed to the second bearing fixing concave portion 51c. In this way, it is possible to maintain an optimal meshing state between the first speed reduction gear 35 and the second speed reduction gear 36 which form the speed reduction mechanism DS1, while smoothly rotating the rotating shaft 22 and the output shaft 32.

The controller unit 40 is formed into a bottomed cylindrical shape by injection molding and the like of resin material such as plastic and includes the board case 41 mounted on the end portion of the motor case 21. The opening side (left side in FIG. 3) of the board case 41 faces a bottom portion 21a of the motor case 21 and the opening side of the board case 41 is, as shown in FIG. 6, provided with a plurality of engaging claw portions 41a. The tip end sides of the engaging claw portions 41a extends toward the motor case 21, and the tip end sides of the engaging claw portions 41a are engaged with the respective engaging concave portions 21d provided at the outer circumferential side of the motor case 21. A total of four engaging claw portions 41a are provided along the circumferential direction of the board case 41 at regular intervals (at intervals of 90 degrees) so as to correspond to the respective engaging concave portions 21d.

The control board 42 is formed of resin material such as for example phenolic resin into an approximately disc shape, accommodated in the board case 41, and mounted on a bottom portion 41b of the board case 41. The control board 42 is provided so as to face the other end side of the rotating shaft 22 in the axial direction of the rotating shaft 22, and electrically connected to coil end portions 27a provided to one end side of the coils 27.

The control board 42 is mounted with six drive circuits (circuit elements) 42a for supplying drive current to each coil 27 and a MR sensor (magnetic sensor) 42b as a rotation sensor for detecting a rotational state of the sensor magnet 24. The drive circuits 42a are arranged along the circumferential direction of the control board 42 and configured to supply drive current to the coils 27 of phases U, V, and W in this order or in reverse order on the basis of the control of an on-vehicle controller (not shown).

The MR sensor 42b is provided at a portion facing the sensor magnet 24 of the control board 42. The MR sensor 42b has a resistance value which is changed in response to the change of the magnetic field due to the rotation of the sensor magnet 24, and generates this change of the resistance value as a detection signal. The MR sensor 42b detects a rotational state (rotational speed, rotational position and the like) of the rotating shaft 22 from the change of the resistance value, and sends the detection signal (resistance value) to the on-vehicle controller.

The control board 42 is provided with a plurality of connecting terminals 42c (only two terminals are illustrated) each of which is made of metallic material such as brass which is excellent in electrical conductivity and formed into a plate shape. One end of each connecting terminal 42c is electrically connected toward the outer circumference of the control board 42, and the other end side of each connecting terminal 42c penetrates through the board case 41, and extends in a direction orthogonal to the axial direction of the rotating shaft 22.

In the board case 41, a hollow connector connecting portion 41c is integrally provided to a portion corresponding to each connecting terminal 42c, and the other end side of each connecting terminal 42c is exposed on the inside of the connector connecting portion 41c. As shown by an arrow mark M in FIG. 2, an external connector OC provided to a vehicle 10 side is inserted into the connector connecting portion 41c, thereby electrically connecting the on-vehicle controller to the control board 42.

Then, an operation of the wiper motor 14 formed as described above will be described in detail with reference to the drawings.

When a wiper switch (not shown) provided in a vehicle interior is switched on, the drive current is supplied to each coil 27 from the on-vehicle controller through each drive circuit 42a of the control board 42. Then, the electromagnetic force is generated in each coil 27, thereby relatively rotating the magnet 25 (rotating shaft 22) with respect to the stator 26 (each coil 27). And the rotation of the rotating shaft 22 is reduced by the speed reduction mechanism DS1 (the first speed reduction gear 35 and the second speed reduction gear 36) so as to obtain a high torque. A turning force of the high torque is transmitted to the link mechanism 15 through the output shaft 32, and each wiper member 13 performs a periodical swinging motion. The detection (position detection) of a reversal position and a stop position of each wiper member 13 is performed by counting the change of the resistance value on the basis of the detection signal of the MR sensor 42b.

Here, a predetermined amount of grease for making both gears rotate smoothly is applied to the meshing portion between the first speed reduction gear 35 and the second speed reduction gear 36. Furthermore, dusts are generated by friction between the first speed reduction gear 35 and the second speed reduction gear 36 due to the long term use of the wiper motor 14. In this way, even if the frictionally-generated dusts, grease and the like are scattered in the gear case 31 by the operation of the wiper motor 14, since the bottom portion 51 of the connecting member 50 and the bottom portion 21a of the motor case 21 are arranged between the speed reduction mechanism DS1 and the control board 42 in this embodiment, the bottom portions 51 and 21a constitute a barrier (separation wall). Therefore, the frictionally-generated dusts, grease and the like are prevented from reaching the control board 42, and it is possible to maintain the control board 42 in a clean state.

As described above, in the wiper motor 14 according to the first embodiment, the first speed reduction gear 35 forming the speed reduction mechanism DS1 is provided to one end side of the rotating shaft 22, the sensor magnet 24 is fixed to the other end side of the rotating shaft 22, the control board 42 is provided so as to face the other end side of the rotating shaft 22 in the axial direction of the rotating shaft 22, and the MR sensor 42b for detecting the rotational state of the rotating shaft 22 is provided to a portion of the control board 42 to as to face the sensor magnet 24, and the coil end portions 27a of the coils 27 generating the electromagnetic force for making the rotating shaft 22 rotate by supplying the drive current from the control board 42 are electrically connected to the control board 42.

In this way, it is possible to arrange the speed reduction mechanism DS1 and the control board 42 to one end side and the other end side of the rotating shaft 22 so as to keep them away from each other, so that extraneous matters such as frictionally-generated dusts, grease and the like can be made difficult to reach the control board 42. Therefore, it is possible to reduce malfunction of each drive circuit 42a and degradation of detection precision of the MR sensor 42b by suppressing deterioration of heat dissipation of the control board 42, and it is possible to reduce maintenance and overhaul in comparison with conventional ones and to control a rotating shaft with high precision over a long period of time.

Furthermore, in the wiper motor 14 according to the first embodiment, since the magnet 25 is mounted on the rotating shaft 22, and the coils 27 are wound on the inside of the stator 26, and the rotating shaft 22 is rotatably provided inside the stator 26 in a contactless state where the magnet 25 is kept from coming contact with each of the coils 27, the wiper motor 14 can be formed by a brushless motor. Therefore, since dusts are not frictionally generated by brush, it is possible to further prevent the extraneous matter from being attached to the control board 42.

Furthermore, in the wiper motor 14 according to the first embodiment, since the control board 42 is accommodated in the board case 41 having the connector connecting portion 41c to be connected to an outside connecter OC, and the board case 41 is mounted on the end portion of the motor case 21 that forms the motor unit 20, it is possible to accommodate the control board 42 in the board case 41 in advance. Therefore, it is possible to easily constitute the wiper motor 14 based on different specifications by selecting an optional control board from the various control boards 42 accommodated in the common board case 41 in advance on the basis of required specifications.

Furthermore, since the rotation sensor is a MR sensor 42b having a resistance value which is changed in response to the change of the magnetic field due to the rotation of the sensor magnet 24, it is possible to provide the wiper motor 14 according to the first embodiment without movable units such as switching components and the like. Therefore, it is possible to enhance the reliability of the wiper motor 14 and to control the rotating shaft 22 with high precision over a long period of time.

Then, a wiper motor according to the second embodiment of the present invention will be described in detail with reference to the drawings. Additionally, portions having functions the same as those of the above described first embodiment are denoted by the same reference numbers as those of the first embodiment and the detail descriptions thereof are omitted here.

Figure 7:
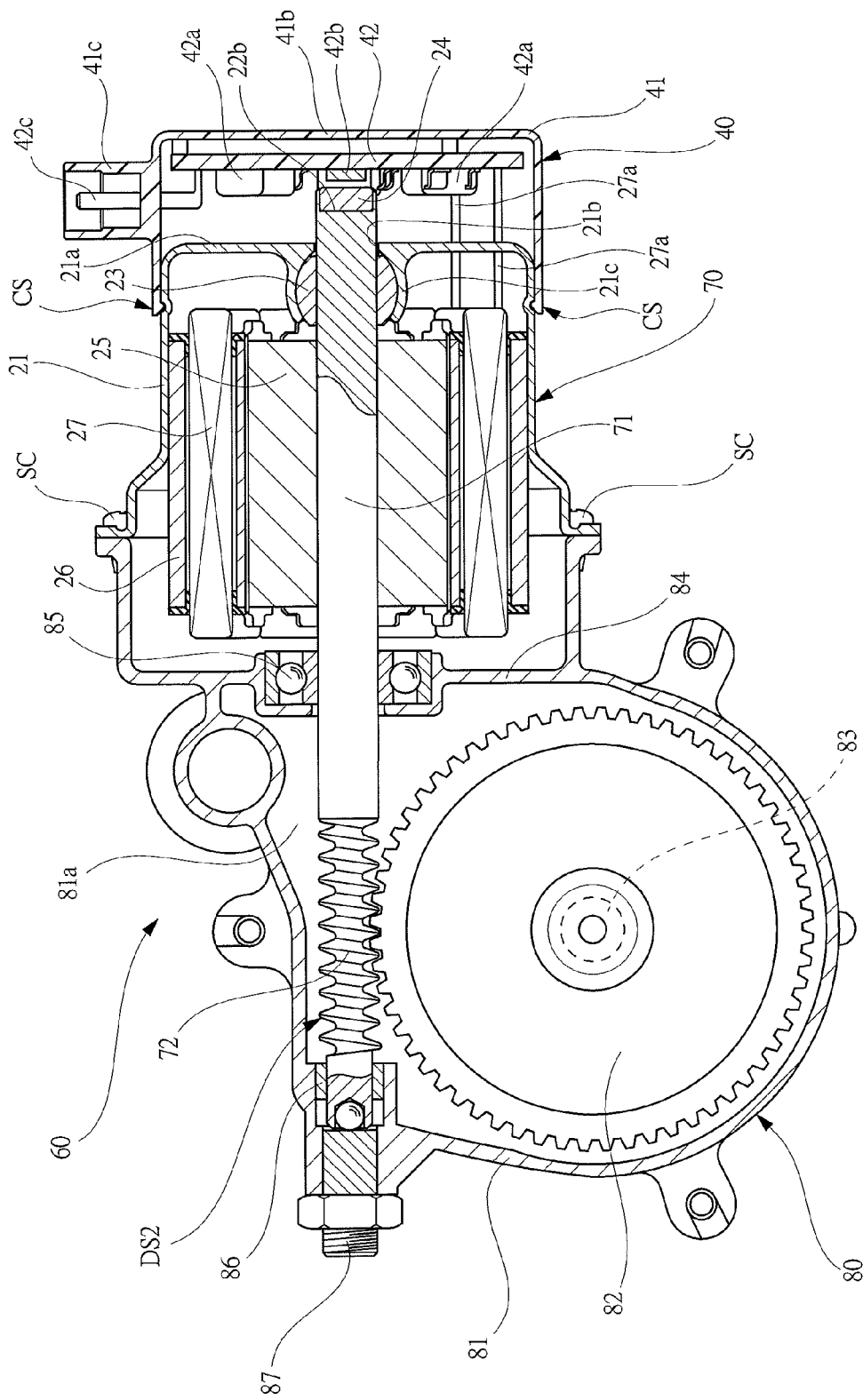
FIG. 7 is a cross sectional view of the wiper motor according to the second embodiment which corresponds to FIG.3.

FIG. 7 is a cross sectional view of a wiper motor according to the second embodiment, and corresponds to FIG. 3.

As shown in FIG. 7, a wiper motor (wiper motor) 60 according to the second embodiment differs from the wiper motor (see FIG.3) according to the first embodiment in that the speed reduction mechanism DS1 is changed in structure, the rotating shaft is changed in shape, the gear case 31 is changed in shape, and the connecting member 50 is omitted.

The wiper motor 60 includes a motor unit 70 and a gear unit 80, and those are connected to each other by a plurality of fastening screws SC.

The motor unit 70 includes a rotating shaft 71 which is longer than the rotating shaft 22 (see FIG. 3) of the first embodiment. One end side of the rotating shaft 71 extends to the inside of the gear case 81 forming the gear unit 80, and one end side of the rotating shaft 71 is integrally provided with a worm (first speed reduction gear) 72 forming a speed reduction mechanism DS2. In the gear case 81, the worm 72 rotates with the rotation of the rotating shaft 71.

The gear unit 80 includes the gear case 81 formed into an approximately bath tub shape. A worm wheel (the second speed reduction gear) 82 forming the speed reduction mechanism DS2 is meshed with the worm 72 and rotatably accommodated in the gear case 81, and the base end side of an output shaft 83 is fixed to the rotational center of the worm wheel 82.

The tip end side of the output shaft 83 extends to the outside through a boss portion (not shown) integrally provided to a bottom portion 81a of the gear case 81, and the tip end side of the output shaft 83 is fixed to one end side of an output plate 15a shown in FIG. 1. Therefore, the rotation of the rotating shaft 71 is reduced in speed by the worm 72 and the worm wheel 82, thereby outputting the speed-reduced rotation to the outside from the output shaft 83.

A motor case 21 side of the gear case 81 is integrally provided with a wall portion 84 which is penetrated by the rotating shaft 71, and the wall portion 84 is provided with a second radial bearing 85 for rotatably supporting an approximately center portion of the rotating shaft 71. Furthermore, in the gear case 81, a third radial bearing 86 for rotatably supporting one end side of the rotating shaft 71 is provided to the opposite side of the motor case 21.

In this way, since both end sides and approximately center portion of the rotating shaft 71 are rotatably supported by the first radial bearing 23, the second radial bearing 85, and the third radial bearing 86, when the wiper motor 60 is rotationally driven, it is possible to obtain a stable rotation without vibration. Although a reactive force (arrow mark in the drawing) from the worm wheel 82 acts on the rotating shaft 71 (worm 72), it is possible to suppress the play of the rotating shaft 71 in the axial direction by an adjusting screw 87 provided to the gear case 81. Therefore, it is possible to suppress generation of abnormal noises from the wiper motor 60.

In the wiper motor 60, the wall portion 84 of the gear case 81 and the bottom portion 21a of the motor case 21 are arranged between the speed reduction mechanism DS2 and the control board 42, and the wall portion 84 and the bottom portion 21a constitute a barrier (separation wall). Therefore, the frictionally-generated dusts, grease and the like are prevented from reaching the control board 42, and it is possible to maintain the control board 42 in a clean state.

Even in the wiper motor 60 according to the second embodiment formed as described above, it is possible to attain the same effect as that of the first embodiment. In addition, in the wiper motor 60 according to the second embodiment, since the wiper motor having the conventional speed reduction mechanism DS2 composed of the worm 72 and the worm wheel 82 does not include a control board to be accommodated in the gear case 81, it is possible to reduce the thickness along the axial direction of the output shaft 83 of the gear case 81. Consequently, the wiper motor 60 can be made compact and on-vehicle mountability can be improved.

It should be understood that the present invention is not limited to each of the above described embodiments, and various modifications and alternations may be made without departing from the scope of the present invention. For example, in each of the above described embodiments, though the rotating shaft 22 (rotating shaft 71) is provided with the magnet 25, the coils 27 are provided inside the stator 26, and a brushless motor is shown as the drive source, the present invention is not limited to this configuration, and may be applied to a motor with brush in which a commutator and a coil are provided to a rotating shaft, and a magnet and a brush are provided to a motor case.

Furthermore, in each of the above described embodiments, though each coil end portion 27a of one end side of each coil 27 is directly and electrically connected to the control board 42, the present invention is not limited to this configuration, and each coil end portion 27a and the control board 42 may be electrically connected to each other through a connector. In this case, when the motor case 21 is mounted on the board case 41, each coil end portion 27a and the control board 42 can be electrically connected to each other with one-touch operation, and it is possible to simplify the assembling process of this motor.

Furthermore, in each of the above described embodiments, though each of the wiper motors 14 and 60 shown as a motor is a drive source of the wiper device which wipes out the front glass 11 of the vehicle 10, the present invention is not limited to the above described embodiments, and the wiper motor may be used as a drive source of the rear wiper device of a vehicle such as an automobile and the wiper device of a railway vehicle and an airplane.

What is claimed is:

1. A wiper motor comprising:
a motor unit having a rotating shaft,
a gear unit having a speed reduction mechanism for reducing the speed of rotation of the rotating shaft and outputting the speed-reduced rotation, and
a controller unit,
wherein the gear unit comprises:
a first speed reduction gear provided to one end side of the rotating shaft and forming the speed reduction mechanism;
a second speed reduction gear meshed with the first speed reduction gear to form the speed reduction mechanism and having an output shaft at a rotational center thereof; and
a gear case in which the speed reduction mechanism is rotatably accommodated;
wherein the controller unit comprises:
a sensor magnet fixed to the other end side of the rotating shaft;
a control board facing the other end side of the rotating shaft from the axial direction of the rotating shaft;
a rotation sensor provided to a portion facing the sensor magnet of the control board and detecting a rotational state of the rotating shaft; and
a board case;
wherein the motor unit comprises:
a motor case formed into a bottomed cylinder shape; and
a coil having one end side electrically connected to the control board and generating the electromagnetic force for rotating the rotating shaft by supply of drive current from the control board; and
wherein the board case is mounted on an end portion of the motor case.

2. The wiper motor according to claim 1, wherein a magnet is mounted on the rotating shaft and the coil is wound on the inside of a stator, and the rotating shaft is rotatably provided inside the stator under a contactless state between the magnet and the coil.

3. The wiper motor according to claim 1, wherein the control board is accommodated in a board case having a connector connecting portion to which an external connector is connected.

4. The wiper motor according to claim 1, wherein the rotation sensor is a MR sensor having a resistance value which is changed in response to the change of a magnetic field due to the rotation of the sensor magnet.

* * * * *